United States Patent [19]
Taquchi et al.

[11] Patent Number: 5,887,891
[45] Date of Patent: Mar. 30, 1999

[54] AIR BAG APPARATUS WITH MOVABLY MOUNTED DOOR

[75] Inventors: Masahiro Taquchi, Hazu-qun; Jun Ohnishi, Kariya; Naoki Nakane, Toyota; Takaaki Ori, Nagoya, all of Japan

[73] Assignee: Denso Corporation, Kariya, Japan

[21] Appl. No.: 824,732

[22] Filed: Mar. 26, 1997

[30] Foreign Application Priority Data

Mar. 27, 1996 [JP] Japan ................................ 8-099100

[51] Int. Cl.⁶ .................................................. B60R 21/20
[52] U.S. Cl. .................................. 280/728.2; 280/728.3; 280/732; 280/740
[58] Field of Search ........................ 280/728.3, 732, 280/728.2, 740, 736, 741, 742, 737

[56] References Cited

U.S. PATENT DOCUMENTS

| | | | |
|---|---|---|---|
| 4,191,392 | 3/1980 | Barnett | 280/740 |
| 5,060,972 | 10/1991 | Satoh et al. | 280/732 |
| 5,062,664 | 11/1991 | Bishop et al. | 280/732 |
| 5,184,843 | 2/1993 | Berger et al. | 280/728.2 |
| 5,378,015 | 1/1995 | Rink et al. | 280/736 |
| 5,407,224 | 4/1995 | Bauer et al. | 280/728.2 |
| 5,456,488 | 10/1995 | Bauer | 280/732 |
| 5,482,313 | 1/1996 | Ikeya et al. | 280/782.2 |
| 5,547,212 | 8/1996 | Dyer et al. | 280/732 |
| 5,588,669 | 12/1996 | Leonard et al. | 280/728.3 |

*Primary Examiner*—Peter C. English
*Attorney, Agent, or Firm*—Pillsbury Madison & Sutro LLP

[57] ABSTRACT

In an air bag apparatus which is installed at an opening of a dashboard, a case fixed to a vehicle dashboard has an opening and side walls having through holes. A door to cover the opening of the case has connecting portions having through holes. The connecting portions of the door are connected to the side walls of the case by stays. In this case, one end of each of the stays is fixed to the outer face of one of the side walls and the other end penetrates both the respective through holes of one of the side walls and one of the connecting portions so that the door can move in three dimensions with respect to the case. As a result, the door can be disposed at the opening of the dashboard without tilting with respect to the upper surface of the dashboard.

25 Claims, 7 Drawing Sheets

AIR BAG APPARATUS WITH MOVABLY MOUNTED DOOR

CROSS REFERENCE TO RELATED APPLICATION

This application is based upon and claims the benefit of priority of the prior Japanese Patent Application No. 8-99100 filed on Mar. 27, 1996, the contents of which are incorporated herein by reference.

BACKGROUND OF THE INVENTION

1. Field of the Invention

The present invention relates to an air bag apparatus for a passenger, provided in an upper part of a dashboard in a vehicle.

2. Related Arts

JP-A-7-117609 discloses an air bag apparatus for a passenger seat installed in an upper part of a dashboard in a vehicle. In the air bag apparatus, a lid (a door) includes tongues extending therefrom. Each of the tongues has a slot. Hook members fixed to a case of an air bag are engaged with the slots, respectively. The lid is positioned at an opening of the upper part of the dashboard. In this case, the lid is allowed to move to some extent because the hook members can move in the slot. Accordingly, the lid can be located on the same plane as the upper part surface of the dashboard.

In the above-mentioned air bag apparatus, when the lid is attached to the case which has been installed in the upper part of the dashboard, the lid is pushed toward the case through the opening of the upper part of the dashboard. At this time, the tongues are elastically deformed outward due to the hook members. As a result, the slots formed on the tongues are engaged with the hook members. However, when the lid is pushed onto the case of the air bag, stress is generated in the lid to deform the lid, thus, adversely influencing a tear-line formed on the lid.

SUMMARY OF THE INVENTION

The present invention has been made in view of the above-mentioned problems, and an object of the present invention is to provide an air bag apparatus installed in an upper part of a dashboard in a vehicle with good appearance and high reliability. More particularly, an object of the present invention is to provide an air bag apparatus having a case and a door movably fitted to the case without causing excessive stress.

In an air bag apparatus according to the present invention, a case holds an inflator for generating gas upon detecting an impact of a vehicle and a bag in a folded state which expands by the gas generated by the inflator. Further, a door is movably attached to the case so as to have degrees of freedom in three dimensions. The case is fixed to the vehicle in an upper part of a dashboard, and the door is disposed to cover an opening of the upper part of the dashboard.

In this case, the door can move in three axial directions with respect to the case. Therefore, when the case is fixed to the vehicle, the relative position of the door with respect to the case can be changed, whereby the door can be disposed to cover the opening of the upper part of the dashboard with a uniform gap between the door and the opening without tilting with respect to the upper surface of the dashboard. As a result, the appearance of the dashboard is improved.

In the air bag apparatus, the case has a pair of side walls opposite to each other, each of which has a first through hole portion at a predetermined position. Further, the door has a door portion and connecting portions vertically extending from the door portion and connected to the side walls. Each of the connecting portions has a second through hole portion at a position corresponding to the predetermined position of the first through hole portion. When the door is attached to the case, the connecting portions are positioned to face the side walls of the case with a minute distance therebetween. Engaging members connect the connecting members and the side walls by penetrating the first and the second through hole portions together so that the door has the degrees of freedom in three dimensions with respect to the case.

Preferably, an end of each engaging member is fixed to an outer face of one side wall of the case, and each engaging member is bent and penetrates both the first and the second through hole portions so that the other end of each engaging member contacts with an inner face of each side wall at the inside of the case. Accordingly, the connecting portions of the door can be connected to the side walls of the case through the engaging members.

More preferably, the first and the second through holes include several first through holes and second through holes, respectively. Further, each engaging member is formed into a comb-like shape having a base portion fixed to the outer face of the side wall and several tooth portions which are integrally connected to the base portion at one end thereof. Each of the tooth portions penetrates both of the first through hole and the second through hole, and is bent so that the other end thereof contacts with the inner face of one side wall at the inside of the case.

In this case, because the engaging members are fixed to the outer faces of the side walls, it is not necessary that the connecting portions have strength enough to fix the engaging members. Therefore, the connecting portions of the door can be made of resin or the like to reduce its weight.

The side wall of the case may have a convex portion protruding outward at a position where the base portion of the engaging member is fixed thereto. In this case, because the strength of the side walls becomes large, each side wall is prevented from being distorted.

Preferably, a fixing member is held in the case so that the bag is sandwiched between the fixing member and the case and is fixed to the case. The fixing member has a plurality of vent holes for diffusing the gas generated in the inflator, and is fixed to the case along with the engaging members.

In this case, the gas generated in the inflator can be efficiently diffused in the bag due to the vent holes of the fixing member. Further, because the fixing member is fixed to the case with the engaging members, it is not necessary to use extra parts such as blind rivets or the like in order to fix the fixing member to the case. Therefore, the construction of the air bag apparatus becomes simple.

Preferably, the fixing member is formed into a cylindrical shape to receive the inflator therein, and has a guide formed on an inner circumferential face thereof. The guide arranges the inflator to a predetermined position in the fixing member. Accordingly, it becomes easy to put the inflator to the predetermined position in the fixing member.

More preferably, the inflator has a flange, of which a diameter is larger than that of the cylindrical fixing member, at an end thereof. When the fixing member of the cylindrical shape is employed and the inflator is held in the fixing member, it is desirable that an end of the fixing member contacts to the flange and the other end of the fixing member contacts to the inner face of the case.

Accordingly, because no space is made between the flange and the fixing member and between the inner face of the case and the fixing member, the gas generated in the inflator can be efficiently introduced into the bag.

The inflator having the flange at the end thereof may be formed with a projecting portion at the other end thereof. In this case, because the diameter of the flange is set to be larger than that of an opening of the side wall for the inflator to be installed in, the flange can contact the side wall at the outside of the case. At this time, the projecting portion projects outward from the opposing side wall and can be fastened by a fastening member at the outside of the case. Therefore, the inflator can be firmly fixed to the case.

Other objects and features of the present invention will become more readily apparent from a better understanding of the preferred embodiments described below with reference to the following drawings.

DETAILED DESCRIPTION OF THE PREFERRED EMBODIMENTS

Embodiments according to the present invention will be described hereinunder with reference to the drawings.

Figure 1A:
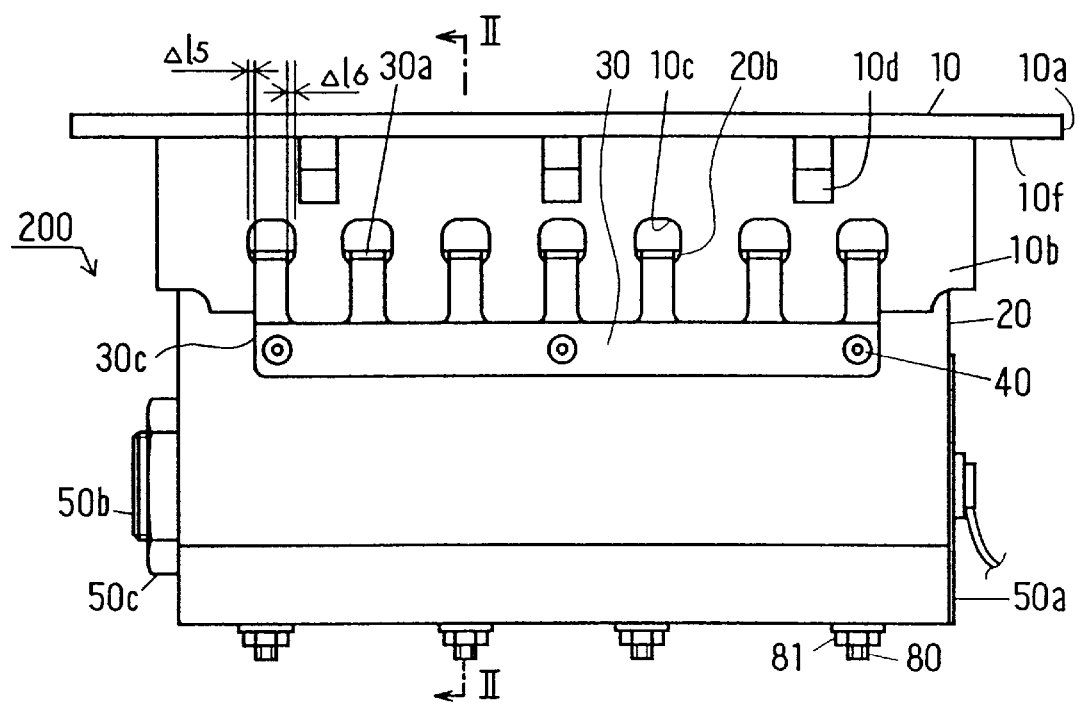
FIG. 1A is a schematic view showing a construction of an air bag apparatus in a first embodiment according to the present invention.
Figure 1B:
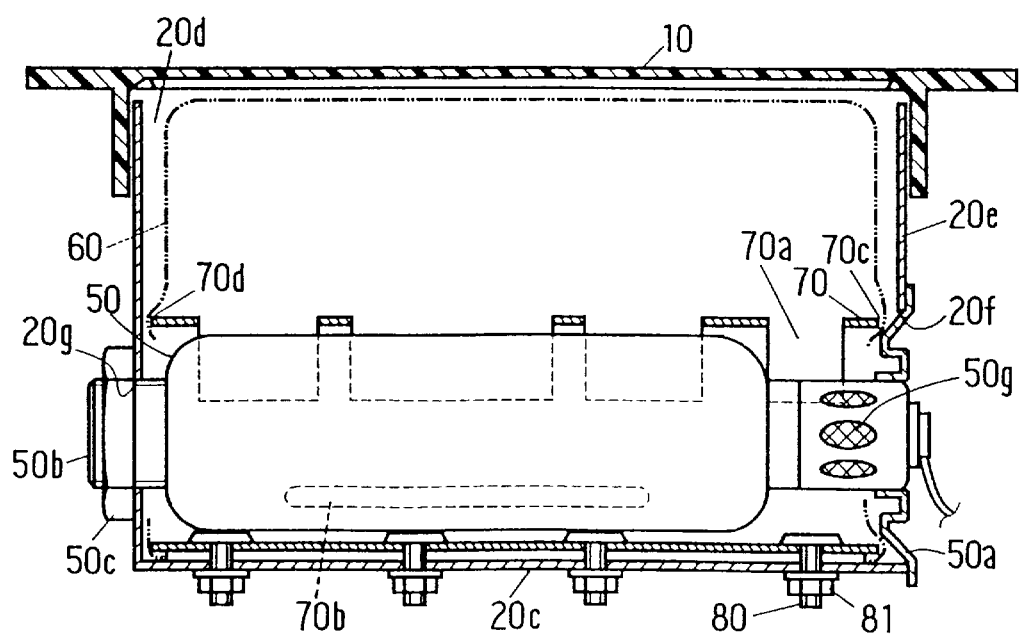
FIG. 1B is a cross-sectional view showing the air bag apparatus in the first embodiment.

FIGS. 1A and 1B show an air bag apparatus 200 in a first embodiment. The air bag apparatus 200 includes a metallic case 20 having an opening 20d at the upper face thereof and side walls 20a and 20e. The side walls 20e are opposite to each other. One of the side walls 20e has a first through hole 20f through which an inflator 50 is inserted into the case 20. The other has a second through hole 20g into which a threaded portion 50b of the inflator 50 is inserted from inside case 20. The second through hole 20g is formed to be opposite to the first through hole 20f. A metallic retainer 70 (a fixing member) of a cylindrical shape is installed in the case 20 to receive the inflator 50 inserted from the first through hole 20f. The retainer 70 has several (four in FIG. 1B) through holes 70a for venting gas produced in the inflator 50.

The inflator 50 has several nozzles 50g at the first through hole side on an outer circumferential face thereof so as to vent the gas produced inside the inflator 50 upon detecting an impact of a vehicle. The inflator 50 also has a flange 50a at the end corresponding to the first through hole 20f and the threaded portion 50b at the end corresponding to the second through hole 20g. The flange 50a has a diameter larger than that of the first through hole 20f so as to close the first through hole 20f and contact one of the side walls 20e at the outside of the case 20. The threaded portion 50b penetrates the second through hole 20g and protrudes outside to be fastened by a nut 50c from outside the case 20. Accordingly, the inflator 50 is fixed to the case 20.

In the case 20, a bag 60 is installed to wrap the retainer 70. The bag 60 is held between an end face 70c of the retainer 70 and the flange 50a, and between the other end face 70d of the retainer 70 and the side wall 20e, and is fixed to the lower wall 20c of the case 20 at the lower side of the retainer 70. The gas produced in the inflator 50 is vented from the through holes 70a of the retainer 70 and fills the bag 60, thus expanding the bag 60.

A door 10 made of resin has a door portion 10a and connecting portions 10b that are connected with the case 20. The door portion 10a is mainly provided over the opening 20d of the case 20. The connecting portions 10b are formed to be generally perpendicular to the door portion 10a and opposite to each other. The door portion 10a has claws 10d on the back face 10f thereof for being hooked at a verge portion 100a of an opening 100 (see FIG. 2) of an upper part of a dashboard (described later). The connecting portions 10b have several (seven in FIG. 1A) holes 10c (a second hole portion) to be penetrated by a pair of stays 30 (an engaging member) made of metal. The door 10 and the case 20 form the casing of the air bag apparatus 200.

Figure 2:
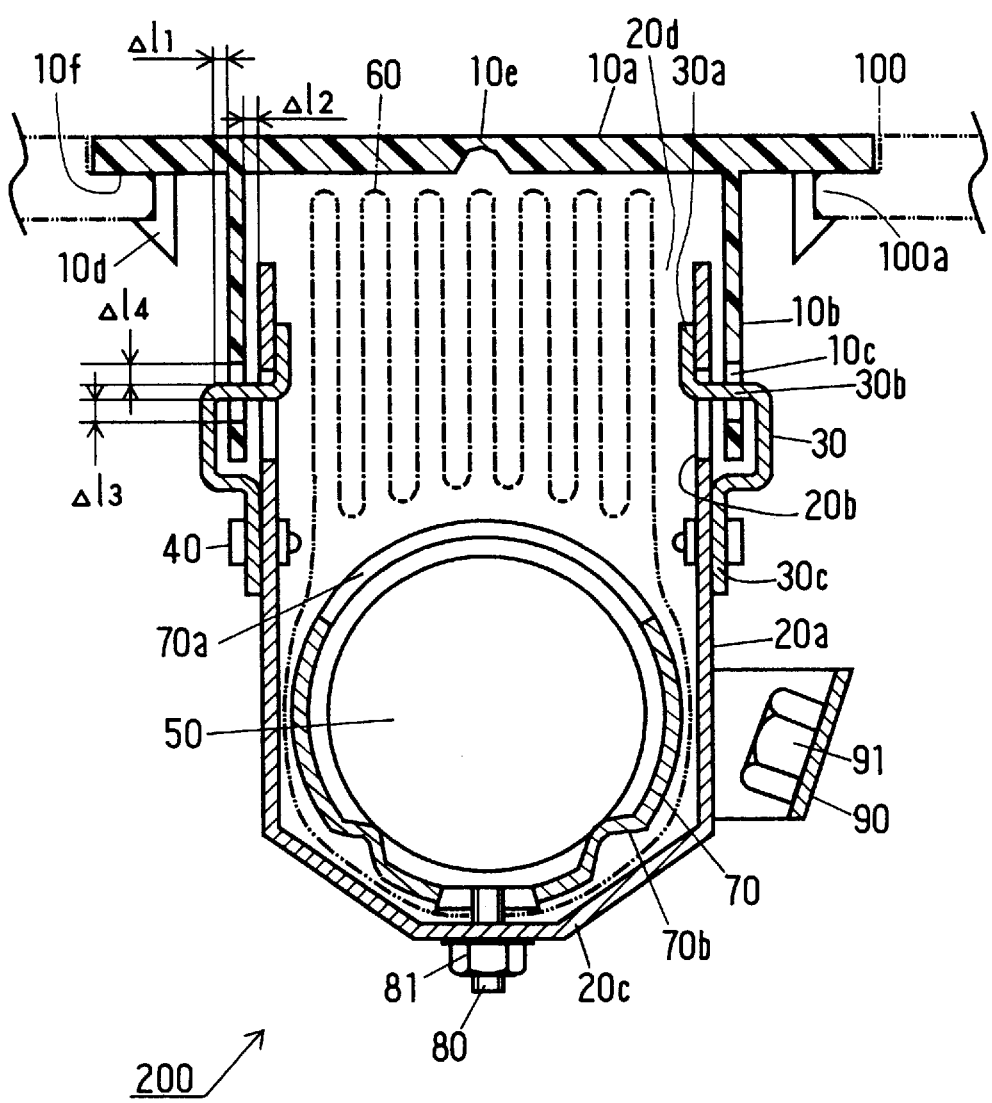
FIG. 2 is a cross-sectional view taken along a line II—II in FIG. 1A, showing the air bag apparatus in the first embodiment.

FIG. 2 shows the air bag apparatus taken along a line II—II in FIG. 1A.

A pair of guide portions 70b are formed convexly on the inner face in an axial direction of the retainer 70, for arranging the inflator 50 in a predetermined position in the retainer 70. The retainer 70 is fixed to the lower face 20c of the case 20 by screwing nuts 81 onto bolts 80 extending from the retainer 70.

The bag 60 is folded to cover the retainer 70 and held in the casing. The bag 60 is fixed to the lower face 20c of the case 20 by being sandwiched between the case 20 and the retainer 70. One of the side walls 20a perpendicular to the side walls 20e has a bracket 90 at the outer face thereof. The bracket 90 is fastened to a reinforcement bar (described later) of the vehicle by utilizing a bolt (not shown) and a nut 91 disposed in the bracket 90.

The claws 10d formed on the back face 10f of the door portion 10a are hooked at the verge portion 100a of the opening 100 of the upper part of the dashboard. Further, the door portion 10a has a thin portion 10e, the thickness of which is thinner than that of the remainder of the door portion 10a. When the air bag 60 is expanded upon detecting the impact of the vehicle, pressure is applied to the door portion 10a by the expanded air bag 60. As a result, the thin portion 10e of the door portion 10a ruptures so as to allow the air bag 60 to expand outside of the casing.

Each of the side walls 20a has holes 20b (a first hole portion). The number and the pitch of the holes 20b are the same as those of the holes 10*c* of the door 10 (see FIG. 1A) The connecting portions 10*b* are disposed outside of the side walls 20*a*, respectively, so that each of the holes 10*c* of the connecting portions 10*b* substantially faces a respective one of the holes 20*b* of the side walls 20*a*. The side walls 20*a* are connected with the connecting portions 10*b* by hooking claws 30*a* of the stays 30 on the inner faces of the side walls 20*a* as shown in FIG. 2.

Each engaging portion 30*b* of the stays 30 movably penetrates the respective holes 10*c* and 20*b*. Further, fixing portions 30*c* (base portion) of the stays 30 are fixed on the outside faces of side walls 20*a* by blind rivets 40. In this case, each side wall 20*a* has holes (not shown ) for the blind rivets 40.

Figure 3:
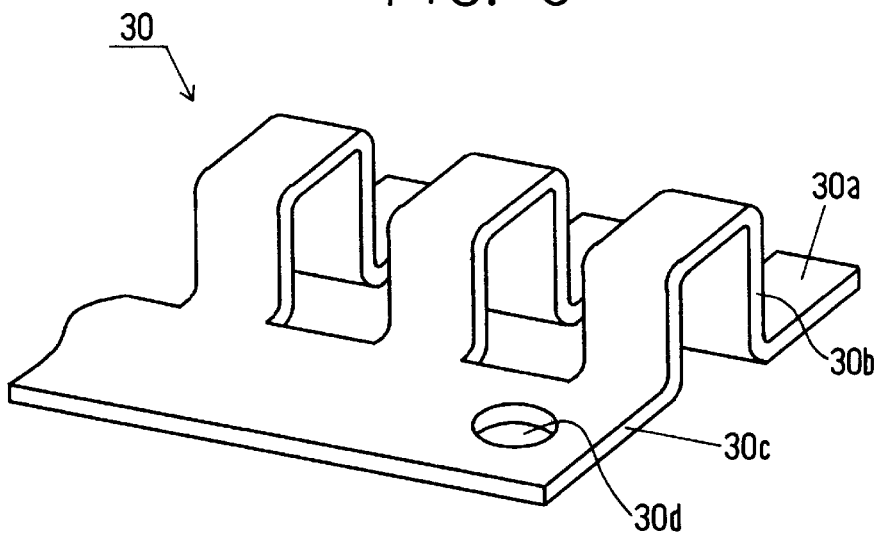
FIG. 3 is a partial schematic view showing a stay in the first embodiment.

FIG. 3 fragmentarily shows one of the stays 30. As mentioned above, each of the stays 30 has the claws 30*a*, the engaging portions 30*b*, and the fixing portion 30*c*. The number and the pitch of the claws 30*a* are the same as those of the holes 10*c* and 20*b*. Further, the fixing portion 30*c* has several (three in FIG. 1A) rivet holes 30*d* to be fixed to one of the side walls 20*a* by the blind rivets 40.

As shown in FIG. 2, the engaging portions 30*b* of the stays 30 movably penetrate the holes 10*c* and 20*b*. Each connecting portion 10*b* of the door 10 has play $\Delta l_1$ and $\Delta l_2$ in the axial direction of the holes 10*c* and 20*b* with respect to the stays 30 and the side walls 20*a*, respectively. Each connecting portion 10*b* further has play $\Delta l_3$ and $\Delta l_4$ in the radial direction of the holes 10*c* and 20*b* in parallel with the page face in FIG. 2, and play $\Delta l_5$ and $\Delta l_6$ in the radial direction of the holes 10*c* and 20*b* perpendicular to the page face in FIG. 2 (refer to FIG. 1A), with respect to each of the engaging portions 30*b* of the stays 30. That is, the door 10 is connected to the case 20 by the stays 30 to have degrees of freedom in three dimensions, so that the door 10 can move by a small amount of length (several millimeters).

Next, the process for assembling the air bag apparatus 200 and mounting it on the vehicle will be explained. First, the retainer 70 and the bag 60 folded in advance are disposed in the case 20, and are fixed on the lower wall 20*c* of the case 20 by utilizing the bolts 80 and the nuts 81 (refer to FIG. 2).

Next, the door 10 closes the opening 20*d* of the case 20 so that each of the holes 10*c* of the door 10 faces one of the holes 20*b* of the case 20. Each of the claws 30*a* of the stays 30 passes through both of the respective holes 10*c* and 20*b* and is hooked at the inner side of the respective side wall 20*a*. In this case, the fixing portions 30*c* of the stays 30 are fixed to the side walls 20*a* by the blind rivets 40.

The inflator 50 is inserted into the retainer 70 through the first through hole 20*f* of the case 20 so that the flange 50*a* contacts one of the side walls 20*e* and the threaded portion 50*b* protrudes outside from the second through hole 20*g* (refer to FIG. 1). The inflator 50 is fixed to the side walls 20*e* with the threaded portion 50*b* being fastened by the nut 50*c* at the outside of one of the side walls 20*e*. In this manner, the air bag apparatus 200 is assembled.

Although, in the first embodiment, the claws 30*a* are engaged with the inside face of the side walls 20*a* with face-contact as shown in FIG. 2, the claws 30*a* may be engaged with the inside face of the side walls 20*a* without having face-contact.

Thereafter, the air bag apparatus 200 is inserted into the upper part of the dashboard through the opening 100 and the door 10 is hooked at the verge portion 100*a* of the opening 100, whereby the door 10 is disposed to cover the opening 100 of the upper part of the dashboard. The bracket 90 is fastened to the reinforcement bar 110 of the vehicle by unitizing the nut 91, whereby the air bag apparatus 200 is mounted on the vehicle.

Figure 4:
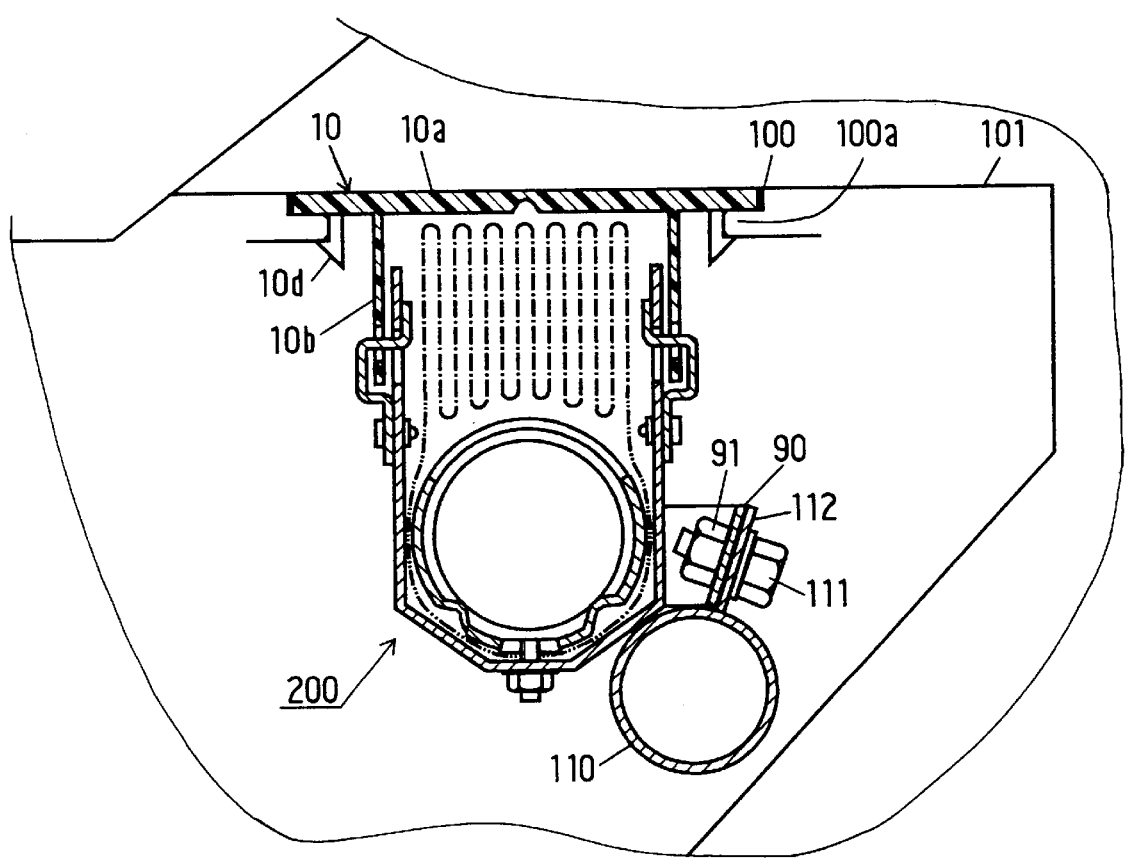
FIG. 4 is a cross-sectional view schematically showing a state in which the air bag apparatus in the first embodiment is mounted on a vehicle.

An arrangement by which the air bag apparatus 200 is mounted on the vehicle is schematically shown in FIG. 4. The bracket 90 is fixed to a stay 112 of the reinforcement bar 110 by fastening the bolt 111 and the nut 91. The door portion 10*a* is disposed to cover the opening 100 of the upper part of the dashboard 101, and the air bag apparatus 200 is held in the upper part of the dashboard 101.

In the air bag apparatus 200, the connecting portions 10*b* of the door 10 are connected to the side walls 20*a* with degrees of freedom in three dimensions with respect to the side walls 20*a* so as to be able to move the small amount of length in three dimensions. Therefore, the door 10 can be disposed to cover the opening 100 of the upper part of the dashboard 101 with a uniform gap between the opening 100 and the periphery of the door portion 10*a*. In this case, even if a relative position between the bracket 90 and the door 10 changes due to a dimensional error of parts of the air bag apparatus 200, the amount of change in the relative position can be compensated by the play of the door 10 with respect to the case 20 in three dimensions. Similarly, even if a relative position between the stay 112 and the opening 100 changes due to a dimensional error generated on a vehicle side, the amount of change in the relative position can be compensated as well.

Therefore, the door 10 can be disposed to cover the opening 100 of the upper part of the dashboard 101 without being inclined with respect to a plane of the opening 100. Further, even if the connecting portions 10*b* of the door 10 are somewhat sloped with respect to the side walls 20*a* and 20*e* of the case 20, because the door 10 has play in three dimensions, the door 10 is not affected by an internal stress from the connecting portions 10*b*. As a result, the appearance of the upper part of the dashboard and the reliability of the air bag apparatus 200 can be improved.

While the present invention has been shown and described with reference to the foregoing preferred embodiment, it will be apparent to those skilled in the art that changes in form and detail may be made therein without departing from the scope of the invention as defined in the appended claims.

Figure 5:
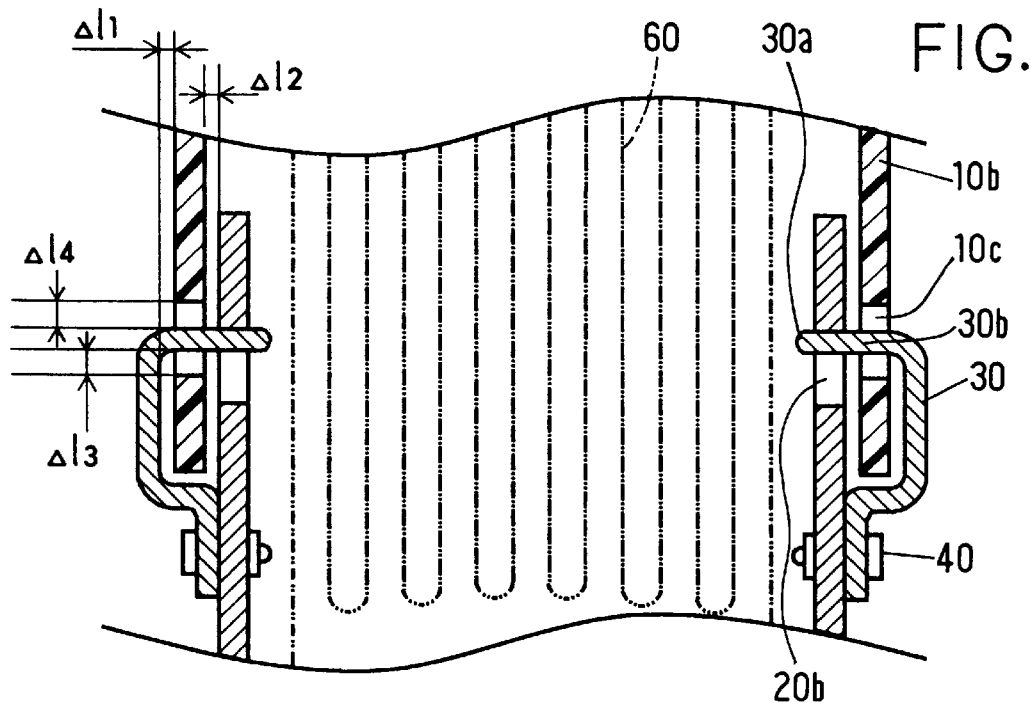
FIG. 5 is a partial cross-sectional view showing stays connecting a door and a case in a modified embodiment of the air bag apparatus.

For example, in the above mentioned air bag apparatus 200, although the claws 30*a* of the stays 30 are hooked at the inner faces of the side walls 20*a* as shown in FIG. 2, the claws 30*a* may protrude to the inside of the case 20 from the side walls 20*a* without being hooked as shown in FIG. 5. The air bag apparatus having the constitution shown in FIG. 5 can attain the same effects as in the first embodiment shown in FIG. 2.

In this case, the end portions of the claws 30*a* are chamfered and the protruding length of the claws 30 from the side walls 20*a* is approximately equal to that of the blind rivets 40 fixing the stays 30 to the side walls 20*a*. Therefore, when the bag 60 expands, it is not damaged by the end portions of the claws 30*a*.

Figure 6:
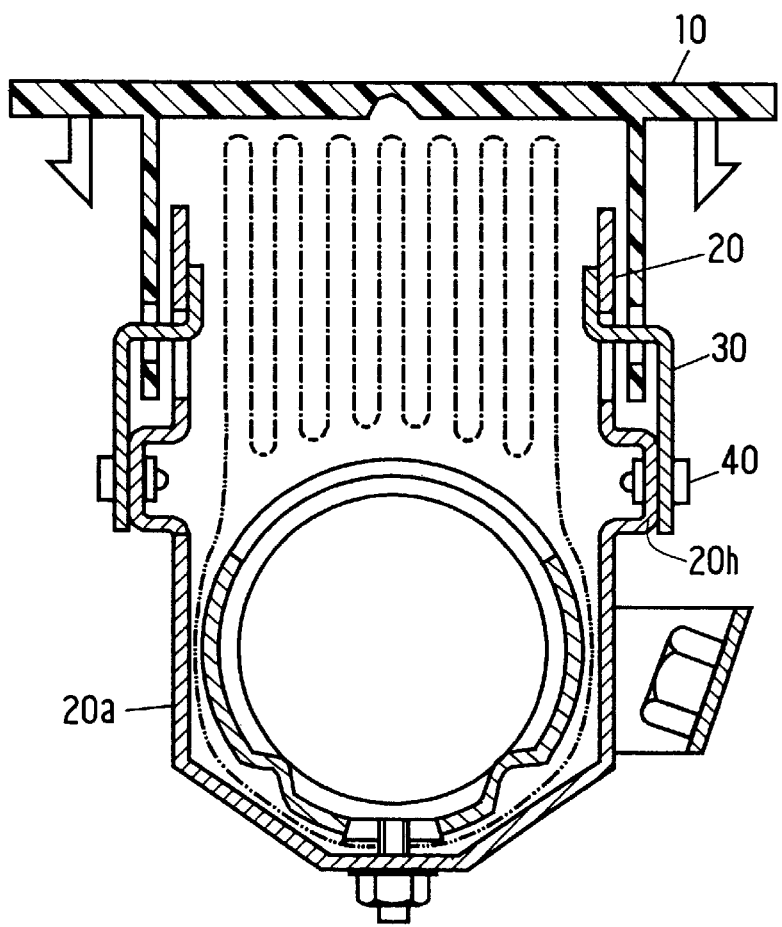
FIG. 6 is a cross-sectional view showing a modified embodiment of an air bag apparatus, in which side walls of a case have protruding portions to be connected to stays by rivets.

Further, in the first embodiment shown in FIG. 2, although each side wall 20*a* where a stay 30 is fixed by the blind rivets 40 is formed into a flat plate, the side wall 20*a* may have convex portions 20*h* protruding outward on which a stay 30 is to be fixed by the blind rivets 40 as shown in FIG. 6. Because the strength of the convex portion 20*h* is greater than that of the other part of the side walls 20*a*, distortion of the side walls 20*a* can be prevented when the stays 30 are fixed to the side walls 20*a* by the blind rivets 40.

Further, the air bag apparatus in the first embodiment employs a pair of stays 30, each having several claws 30*a* formed into a comb-like shape as shown in FIG. 3. However, it should be noted that a pair of or several pairs of stays 30 having only one claw 30a respectively can be adopted for connecting the door 10 and the case 20.

It is not necessary that the claws 30a are bent up (to a door portion side in FIG. 2) from the engaging portions 30b. The claws 30a may be bent down (to an inflator side in FIG. 2) to form a U-shape. In this case, the length of each claw 30a is short enough to be assembled easily. The stays 30 having the U-shaped claws 30a can also realize the same effects as those in the first embodiment having the constitution shown in FIG. 2.

Figure 7:
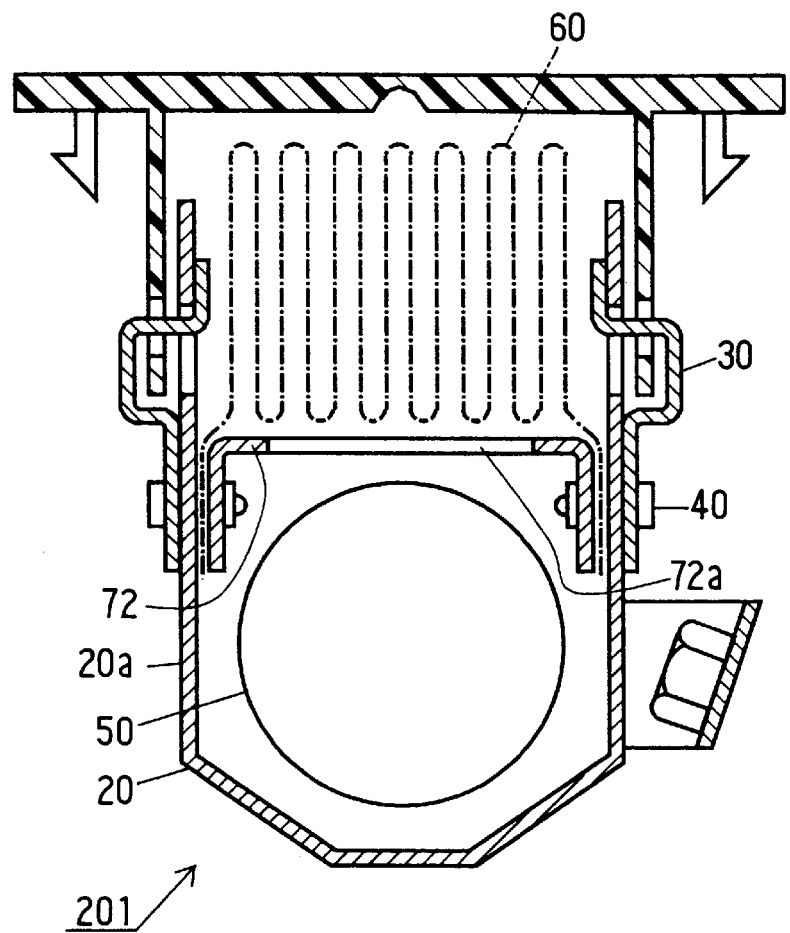
FIG. 7 is a cross-sectional view showing a modified embodiment of an air bag apparatus having a diffuser plate.

In the first embodiment, the retainer 70 for fixing the bag 60 to the case 20 has the guide portions 70b so as to support the inflator 50. As shown in FIG. 7, however, a diffuser plate 72 having through holes 72a for diffusing gas, which does not support the inflator 50, can be adopted to an air bag apparatus 201 in order to fix the bag 60 to the case 20.

FIG. 7 shows the air bag apparatus having the diffuser plate 72. In the air bag apparatus 201, the blind rivets 40 fix the diffuser plate 72 and the bag 60 to the case 20 on the inner face of the side walls 20a. At the same time, the blind rivets 40 fix the stay 30 to the case 20 on the outer face of the side walls 20a. As mentioned above, the diffuser plate 72 has several through holes 72a for diffusing gas generated in the inflator 50. The inflator 50 is not supported by the diffuser plate 72, but is fixed to the side walls 20e (not shown in FIG. 7) of the case 20 in the same manner as in the first embodiment.

By adopting the constitution, the blind rivets 40 for fixing each stay 30 to one side wall 20a can fix the bag 60 and the diffuser plate 72 to the side walls 20a at the same time. Therefore, in the air bag apparatus 201 shown in FIG. 7, it is not needed to use the bolts 80 and the nuts 81 used in the air bag apparatus 200 shown in FIG. 2 for fixing the retainer 70 to the lower wall 20c of the case 20. Therefore, the constitution of the air bag apparatus 201 shown in FIG. 7 is simpler than that of the air bag apparatus 200 shown in FIG. 2.

Figure 8:
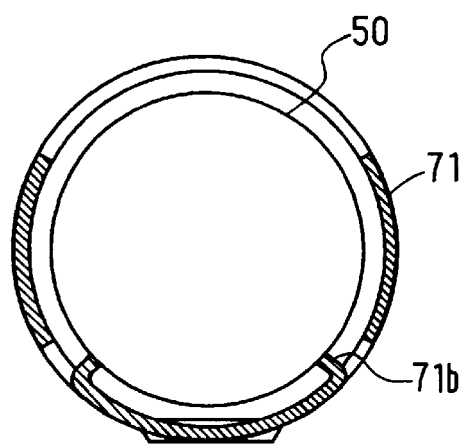
FIG. 8 is a cross-sectional view showing a retainer having cut-up guide portions in a modified embodiment of the air bag apparatus.

Although the retainer 70 shown in FIG. 2 has a pair of guide portions 70b of a convex shape on the inner face in the axial direction thereof, the shape of the guide portions 70b is not limited to the above-mentioned shape. For example, as shown in FIG. 8, a retainer 71 may have a pair of guide portions 71b which are formed by cutting the retainer 71 itself in the axial direction and bending cut portions to the inside of the retainer 71 to elongate in the axial direction. The guide portions 71b support the inflator 50 when the inflator 50 is inserted into the retainer 71, whereby the inflator 50 can be placed at a predetermined position.

Figure 9:
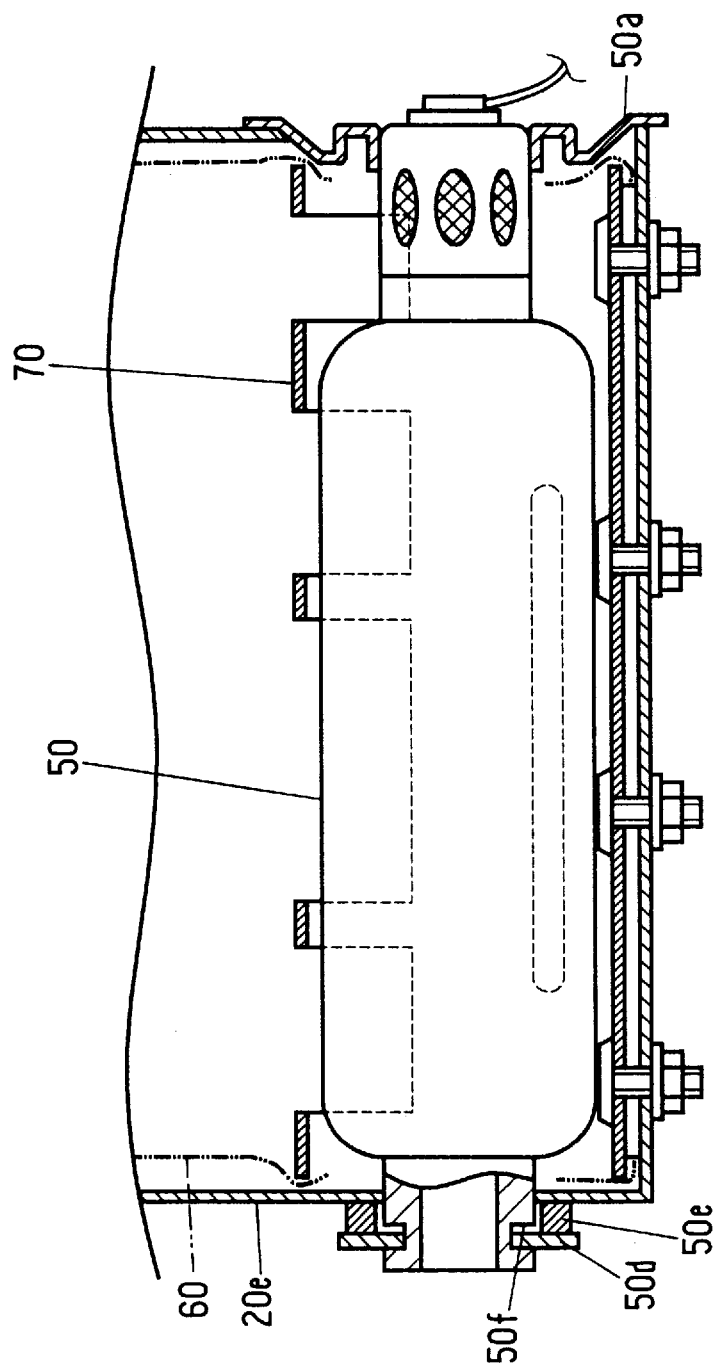
FIG. 9 is a cross-sectional view showing an inflator fixed to a case by utilizing a wave washer and a C-shaped clip in a modified embodiment of the air bag apparatus.

As shown in FIG. 1, the inflator 50 in the first embodiment has the flange 50a at an end thereof and the threaded portion 50b at the other end thereof. The threaded portion 50b is fastened by the nut 50c from the outside of the side wall 20e so that the inflator 50 is fixed to the case 20. The method fixing the inflator 50 is, however, not limited to the above-mentioned method. For example, as shown in FIG. 9, the inflator 50 may be fixed to the case 20 by utilizing a C-shaped clip 50d (a fastening member). That is, a groove 50f is formed at the end of the inflator 50, and the C-shaped clip 50d is put into the groove 50f through an elastic member such as a wave washer 50e or the like at the outside of the side wall 20e. Accordingly, the inflator 50 can be firmly fixed to the side wall 20e.

In FIG. 9, although the C-shaped clip 50d is adopted as the fastening member, it is acceptable to use another fastening member which can be put into the groove 50f. Therefore, an E-shaped clip or the like can be adopted instead of the C-shaped clip.

In the first embodiment, as shown in FIG. 1, the bag 60 is sandwiched between the end face 70c of the retainer 70 and the flange 50a, and between the end face 70d and the inner face of the side wall 20e. However, the end faces 70c and 70d may be contacted to the flange 50a and the inner face of the side wall 20e, respectively, as shown in FIG. 10.

Figure 10:
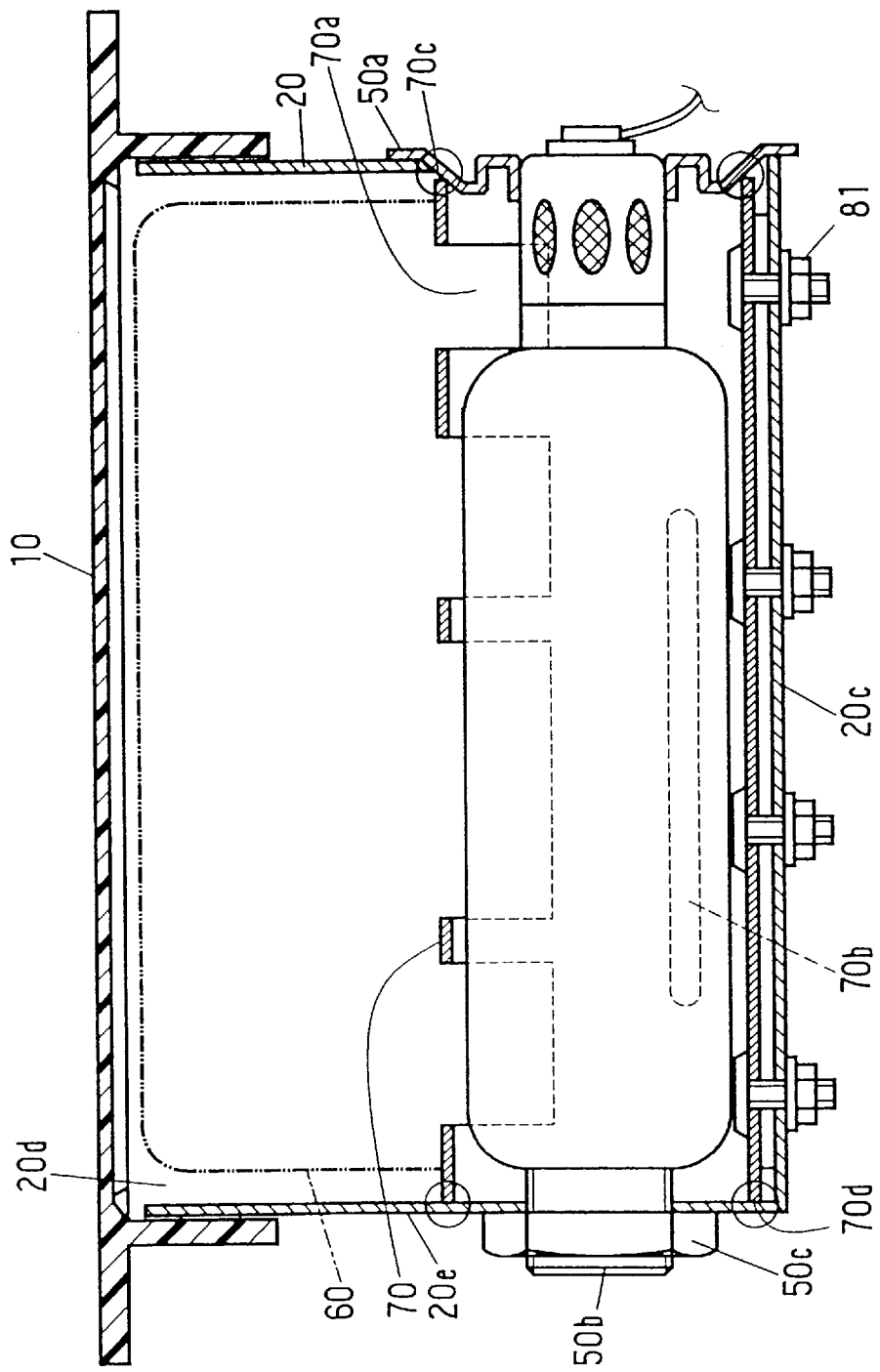
FIG. 10 is a cross-sectional view showing a modified embodiment of an air bag apparatus, in which both ends of a retainer are contacted to a case and a flange of an inflator, respectively.

In the constitution shown in FIG. 10, because there is no space between the end face 70c and the flange 50a, and between the end face 70d and the inner face of the side wall 20e, the gas produced in the inflator 50 upon detecting the impact of the vehicle can be efficiently introduced into the bag 60.

When the threaded portion 50b of the inflator 50 is fastened by the nut 50c, a washer may be used so that the stiffness of the case 20 becomes large.

Variations such as those described above are to be understood as being within the scope of the present invention as defined by the appended claims.

What is claimed is:

1. An air bag apparatus provided in a dashboard where an opening is formed, for protecting a passenger from an impact of a vehicle, the air bag apparatus comprising:

a case fixed to the vehicle in the dashboard, the case having an opening and a pair of side walls opposite to each other, each of the side walls having a first through hole portion at a predetermined position;

an inflator held in the case for generating gas upon detecting the impact of the vehicle;

a bag held in a folded state in the case, which expands by the gas generated from the inflator in order to protect the passenger;

a door having a door portion for closing the opening of the case in a normal state and for allowing the bag to expand outside of the door when the bag is expanded, and connecting portions which are connected to the side walls of the case, the connecting portions vertically extending from a back face of the door portion so as to face the side walls of the case, each of the connecting portions having a second through hole portion at a position corresponding to the predetermined position of the first through hole portion of one of the side walls; and engaging members for connecting each of the connecting portions of the door and the respective side walls of the case by penetrating the respective first through hole portion and the respective second through hole portion together so that the door has degrees of freedom in three dimensions with respect to the case, the engaging members being fixed to the side walls with a specific distance from the respective first through hole portion.

2. An air bag apparatus according to claim 1, wherein:

each of the connecting portions is disposed at an outer side of one of the side walls;

one end of each of the engaging members is fixed to an outer face of one of the side walls at the outside of the case; and each of the engaging members is bent so that another end of each of the engaging members faces an inner face of one of the side walls at the inside of the case.

3. An air bag apparatus according to claim 1, wherein:

the first through hole portion of each of the side walls includes several first through holes; and the second through hole portion of each of the connecting portions includes several second through holes so that each of the second through holes is opposed to one of the first through holes.

4. An air bag apparatus according to claim 1 further comprising:

a fixing member held in the case and fixed to the side walls with the engaging members, the fixing member having a plurality of vent holes for diffusing the gas from the inflator to the bag, wherein the bag is sandwiched between the fixing member and the case to be fixed to the case.

5. An air bag apparatus according to claim 1, further comprising:

a fixing member of a cylindrical shape held in the case for receiving the inflator and for holding the bag with the case to fix the bag to the case, the fixing member having a vent hole for introducing the gas from the inflator to the bag and a guide elongated in an axial direction at an inner circumferential side of the fixing member for arranging the inflator into a predetermined position.

6. An air bag apparatus according to claim 5, wherein:

the inflator has a flange at an end thereof and the bag is sandwiched between the flange and the fixing member, and between one side wall and the fixing member.

7. An air bag apparatus according to claim 1 further comprising:

a fixing member of a cylindrical shape held in the case for receiving the inflator, the fixing member having a vent hole for introducing the gas from the inflator to the bag, wherein:

the inflator has a flange at an end thereof;

an end of the fixing member contacts the flange; and the other end of the fixing member contacts one of the side walls.

8. An air bag apparatus according to claim 7 further comprising:

a fastening member for fastening the inflator to the case, wherein:

the flange formed at the end of the inflator contacts the outer face of one of the side walls;

the inflator has a groove at the other end thereof; and the other end of the inflator having the groove protrudes outside from the case to be fastened by the fastening member, so that the inflator is fixed to the case.

9. An air bag apparatus according to claim 8, wherein the inflator is fastened by the fastening member through an elastic member.

10. An air bag apparatus according to claim 1, wherein the engaging members are fixed to the side walls by fixing parts penetrating the engaging members and the side walls.

11. An air bag apparatus according to claim 10, wherein the fixing parts are rivets.

12. An air bag apparatus provided in a dashboard where an opening is formed, for protecting a passenger from an impact of a vehicle, the air bag apparatus comprising:

a case fixed to the vehicle in the dashboard, the case having an opening and a pair of side walls opposite to each other, each of the side walls having a first through hole portion at a predetermined position;

an inflator held in the case for generating gas upon detecting the impact of the vehicle;

a bag held in a folded state in the case, which expands by the gas generated from the inflator in order to protect the passenger;

a door having a door portion for closing the opening of the case in a normal state and for allowing the bag to expand outside of the door when the bag is expanded, and connecting portions which are connected to the side walls of the case, the connecting portions vertically extending from a back face of the door portion so as to face the side walls of the case, each of the connecting portions having a second through hole portion at a position corresponding to the predetermined position of the first through hole portion of one of the side walls; and engaging members for connecting each of the connecting portions of the door and the respective side walls of the case by penetrating the respective first through hole portion and the respective second through hole portion together so that the door has decrees of freedom in three dimensions with respect to the case, wherein:

the first through hole portion of each of the side walls includes several first through holes; and the second through hole portion of each of the connecting portions includes several second through holes so that each of the second through holes is opposed to one of the first through holes;

each of the engaging members is formed into a comb shape having a base portion and several tooth portions which are integrally connected to the base portion at one end thereof;

each of the tooth portions penetrates both the respective first through hole and the respective second through hole and is bent to contact with the inner face of one of the side walls at the inside of the case; and each of the base portions is fixed to the respective side wall at the outside of the case.

13. An air bag apparatus according to claim 12, wherein:

each of the connecting portions is disposed at an outer side of one of the side walls; and an end of the base portion of each engaging member is fixed to the respective side wall where the respective wall is not covered by the respective connecting portion.

14. An air bag apparatus according to claim 13, wherein:

the end of the base portion of each engaging member is fixed to the respective side wall where a convex portion protruding outward is formed on the outer side of the respective side wall.

15. An air bag apparatus provided in a dashboard where an opening is formed, for protecting a passenger from an impact of a vehicle, the air bag apparatus comprising:

an inflator for generating gas upon detecting the impact of the vehicle;

a bag which expands by the gas generated in the inflator for protecting the passenger;

a case for holding the inflator and the bag in a folded state, the case having an opening and a pair of side walls opposite to each other, each of the side walls having a first through hole portion;

a door composed of a door portion which covers the opening of the case and connecting portions vertically extending from the door portion, each of the connecting portions having a second through hole portion at a position corresponding to a respective one of the first through hole portions; and engaging members for connecting the side walls of the case and the connecting portions of the door by penetrating both the first and the second through hole portions so as to make a space between the side walls and the connecting portions, the engaging members being fixed to the side walls of the case with a specific distance from the respective first through hole portion, wherein a width of the engaging members is smaller than a diameter of the second through hole portions so as to make a space between each of the engaging members and a periphery of the respective second through hole portion.

16. An air bag apparatus according to claim 15, wherein the engaging members are fixed to the side walls by fixing parts penetrating the engaging members and the side walls.

17. An air bag apparatus according to claim 16, wherein the fixing parts are rivets.

18. An air bag apparatus for protecting a passenger from an impact of a vehicle, the air bag apparatus comprising:

a case fixed to the vehicle and having an opening and a side wall, the side wall having a first through hole portion;

an inflator held in the case for generating gas upon detecting the impact of the vehicle;

a bag held in a folded state in the case, which expands by the gas generated from the inflator in order to protect the passenger;

a door having a door portion which covers the opening of the case and a connecting portion protruding from the door portion to face the side wall, the connecting portion having a second through hole portion at a position corresponding to the first through hole portion and an end portion provided on an opposite side of the second through hole portion with respect to the door portion; and an engaging member having a base portion fixed to the side wall, an engaging portion for penetrating the first and second through hole portions to connect the side wall and the connecting portion, and a covering portion provided between the base portion and the engaging portion, for covering the end portion of the connecting portion.

19. An air bag apparatus according to claim 18, wherein the covering portion of the engaging member protrudes further than the base portion in a direction perpendicular to the side wall.

20. An air bag apparatus according to claim 18, wherein:

the connecting portion of the door faces an outer surface of the side wall of the case; and the base portion of the engaging member is fixed to the outer surface of the side wall.

21. An air bag apparatus according to claim 20, wherein:

the engaging member has a claw portion at an end on an opposite side of the base portion, the claw portion being for abutting a surface of the side wall.

22. An air bag apparatus according to claim 18, wherein:

the first through hole portion has a first plurality of through holes;

the second through hole portion has a second plurality of through holes at positions corresponding to the first plurality of through holes; and the engaging member includes the base portion fixed to a surface of the side wall and a plurality of tooth portions, each of the tooth portions being for penetrating one of the first plurality of through holes and a corresponding one of the second plurality of through holes and being bent to contact another surface of the side wall at an end thereof.

23. An air bag apparatus according to claim 22, wherein the base portion is fixed to the side wall where a convex portion protruding outward is formed on an outer side of the side wall.

24. An air bag apparatus according to claim 18, wherein:

the case has first and second side walls opposed to one another, each having a first through hole portion;

the door has first and second connecting portions opposed to one another, each having a second through hole portion; and the engaging member is one of first and second engaging members, each penetrating respective ones of the first and second through hole portion.

25. An air bag apparatus according to claim 18, wherein the engaging member movably connects the side wall and the connecting portion.

* * * * *